May 5, 1970      E. J. McHENRY      3,510,353
SEALED BATTERY
Filed March 29, 1968
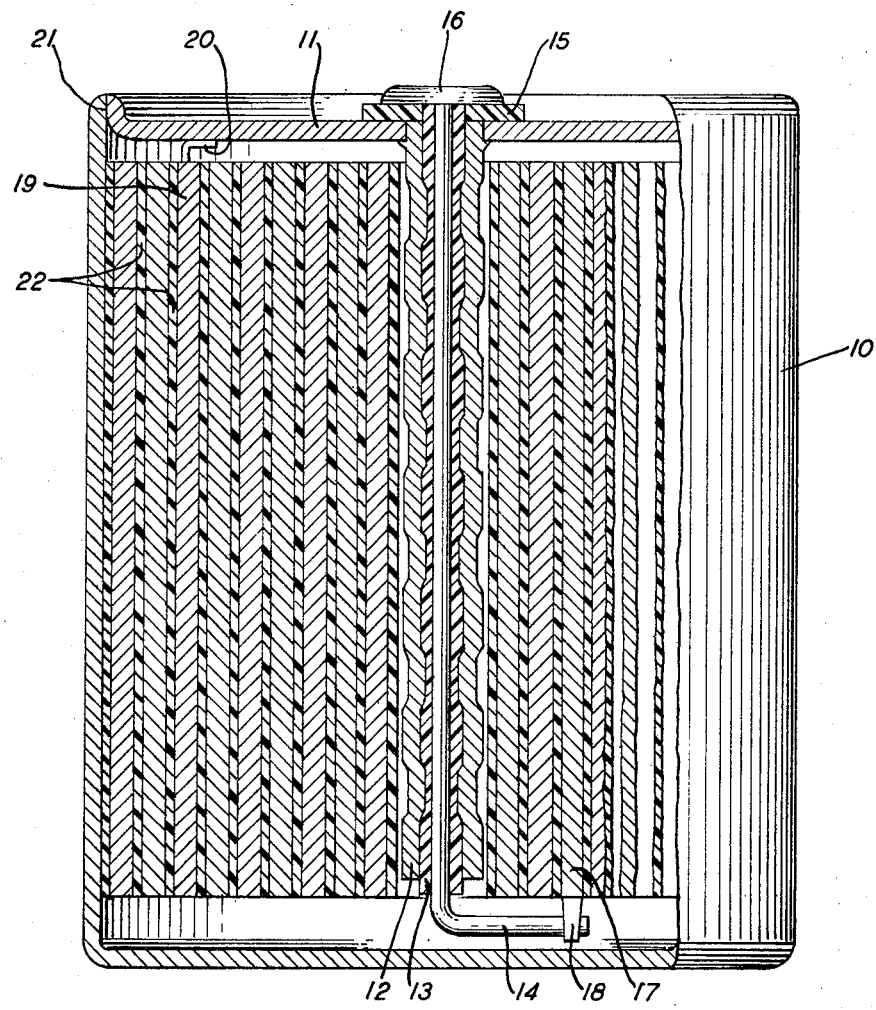
INVENTOR
E. J. McHENRY
BY
ATTORNEY

United States Patent Office 3,510,353
Patented May 5, 1970

3,510,353
SEALED BATTERY
Edwin J. McHenry, Millington, N.J., assignor to Bell Telephone Laboratories, Incorporated, Berkeley Heights, N.J., a corporation of New York
Filed Mar. 29, 1968, Ser. No. 717,270
Int. Cl. H01m 35/16
U.S. Cl. 136—13                                7 Claims

ABSTRACT OF THE DISCLOSURE

The specification describes a hermetic seal design for sealed batteries especially nickel-cadmium batteries employing rolled electrodes. The seal is a metal tube integral with the cover and depending into the cell. The tube contains a plastic sleeve through which the wire contact is threaded. The tube is crimped at several positions along its length and can serve as a mandril around which the electrodes are rolled.

---

This invention relates to an improved hermetic seal for electrolytic cells.

One of the common causes of failure in sealed batteries occurs through leakage at the electrode post seal. It is customary for the battey receptacle to function as one electrode contact, usually as the negative pole and the other electrode contact to extend through an insulating bushing into the interior of the cell receptacle where it contacts the positive plate or plates. The seal between this electrode post and the receptacle must withstand moderate pressures at ambient temperatures for extended periods. It is often found that thermal cycling over the ambient temperature range can be quite severe in some climates and that daily excursions of 30° F. and seasonal excursions of 130° F. are common in temperate regions. These thermal cycles produce differential expansions and contractions that ultimately contribute to the failure of ordinary post seals.

The present invention is directed to a post-seal design which ensures a positive seal capable of withstanding high pressures for prolonged periods and which is essentially unaffected by extreme and continuous thermal cycling. Its effectiveness is largely due to the inordinate length of the seal. The extensive length of the seal is possible since the seal is made to depend into the interior of the receptacle and the limiting length is the long dimension of the cell receptable. The post inthe post-seal assembly can alternately serve as a mandril in cells employing rolled electrodes. In this capacity it does not usurp any electrochemically useful volume inside the cell.

The post and seal assembly consist of an elongated metal tube extending essentially to the bottom of the cylindrical or rectangular receptacle, a plastic sheath or liner inside the metal tube and a wire electrode extending through the sheath. The metal tube is then crimped at several portions along its length to complete the seal. The extensive length of the seal assembly makes it possible to crimp the tube at more than one position. Alternatively the tube can be crimped along its entire length.

These and other aspects of the invention will become more evident from the following detailed description.

In the drawing:
The figure is a front elevation in section of a cell with a post seal designed in accordance with this invention.

The cell shown in the figure and used as exemplary for this description is a nickel-cadmium cell of a common commercial design. It is similar in size and geometry to a standard "D" cell with the button positive terminal centrally located in the top of the can with the receptacle connected to the negative elecrodes.

In the figure the receptacle 10 is a nickel-plated steel cylinder which initially is open at the top. The cover 11 which is also nickel-plated steel has a centrally located opening to accommodate the positive post. A metal tube 12 is welded to the top and extends almost to the bottom of the receptacle. The tube can be nickel or nickel-plated metal. If the polarity of the cell is reversed to make the center post negative (an alternative which can be conveniently arranged) then the tube 12 can be any metal that possesses the obvious structural requisites and is not adversely affected by the electrolyte in the cell. The cover 11 and tube 12 can alternatively be fabricated in one piece. A hollow plastic tubing or sleeve 13 is inserted in the metal tube and the positive electrode wire contact 14 fits within the plastic tubing 13. The wire must be conductive but otherwise has the same limitations as the metal tube 12. The tube 12 is crimped at several positions along its length to effect the seal between the wire 14 and the tube 12. The crimping places the plastic 13 under both axial and radial compression and makes an extremely effective seal. The seal is particularly effective when the assembly contracts and expands during thermal cycling. A plastic washer 15, which may be separate or integral with the plastic sleeve, insulates the positive button 16 from the negative receptacle. The positive button 16 would normally be the terminal part of the wire 14, but other arrangements can be equally effective. Finally the electrodes themselves are shown here in rolled form which is common in this type of cell. This form of electrode is particularly well adapted to the sealing arrangement of this invention since the seal, depending into the receptacle, acts advantageously as a mandril around which the electrodes are rolled. The nickel hydroxide positive electrode 17 is connected through tab 18 to the positive contact wire 14. The cadmium negative electrode 19 is connected to the receptacle by tab 20. Adjacent electrodes are insulated with a conventional separator 22. Multiple electrode arrangements and other electrode configurations can also be used with the post-seal design of this invention.

In the specific embodiment shown in the figure the wire 14 is a 30 mil nickel wire, the plastic tubing 13 is 70 mil poly-triflourochloroethylene, and the tube 12 is a ⅛ inch nickel tube. The plastic for the sleeve 13 can also be polypropylene, nylon, high density polyethylene or any polymer which is relatively inert to the electrolyte, is sufficiently elastic to be crimped without fracture, and which does not cold-flow excessivley under the moderate (100 p.s.i.) encountered in sealed cells.

In a preferred embodiment the plastic should have the following room temperature properties to insure optimum attainment of the above goals: at least 10 percent plastic deformation in compression without fracture, at least 2 percent elastic recovery, a yield point in excess of 1000 p.s.i. and stress relaxation of less than 20 percent in 10 years under a load of 1000 pounds.

With the cell design shown in the figure the seal would normally be assembled first and the electrodes placed around the crimped tube 12. The wire 14 would then be bent and attached to tab 18 and the negative connection made. This assembly can then be placed in the receptacle 10 and sealed by weld circumferential 21.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A sealed cell comprising a receptacle, electrodes within the receptacle, a metal tube integral at one end thereof with the receptacle and extending into the volume of the receptacle to a depth limited approximately by the receptacle itself, a plastic sheath extending entirely through the tube, and a contact wire extending from the exterior of the receptacle through said sheath to contact an electrode within the receptacle, the said metal tube being crimped at several positions along its length to compress the plastic sheath against the wire and effect a pressure seal between the metal tube and the contact wire.

2. The cell of claim 1 wherein the tube is crimped along substantially its entire length.

3. The cell of claim 1 wherein the electrodes are rolled about the metal tube and the tube functions as a mandril.

4. The cell of claim 1 wherein the plastic has a composition selected from the group consisting of polychlorotrifluoroethylene, polyethylene, polypropylene and nylon.

5. The cell of claim 1 wherein the plastic has the following room temperature characteristics: at least 10 percent plastic deformation in compression without fracture, at least 2 percent elastic recovery, a yield point in excess of 1000 p.s.i. and stress relaxation of less than 20 percent in 10 years under a load of 1000 pounds.

6. The cell of claim 1 wherein the depth of the receptacle to which the tube and seal extends approximates the largest dimension of the receptacle.

7. The cell of claim 1 in which the electrodes are nickel and cadmium.

References Cited

UNITED STATES PATENTS

| 2,312,791 | 3/1943 | Bahr. | |
|---|---|---|---|
| 2,892,006 | 6/1959 | Belove | 136—168 |
| 3,007,992 | 11/1961 | Lehovec | 136—83 |
| 3,262,818 | 7/1966 | Di Pasguale et al. | 136—135 |
| 3,326,724 | 6/1967 | Armitage | 136—13 |

ALLEN B. CURTIS, Primary Examiner

C. F. LE FEVOUR, Assistant Examiner

U.S. Cl. X.R.

136—134, 168